United States Patent [19]

James

[11] 3,943,078
[45] Mar. 9, 1976

[54] SOIL PENETRATING, COMPACTING AND CEMENTING COMPOSITION

[76] Inventor: Thomas Howard James, 3835 Bledsoe Ave., Los Angeles, Calif. 90066

[22] Filed: Nov. 11, 1974

[21] Appl. No.: 522,358

Related U.S. Application Data

[63] Continuation-in-part of Ser. No. 170,979, Aug. 11, 1971, abandoned.

[52] U.S. Cl. .................. 260/17 R; 47/9; 252/8.5 P; 260/17.4 SG; 260/DIG. 14
[51] Int. Cl.² ............................................ C08L 1/28
[58] Field of Search.... 260/17 R, 17.4 SG, DIG. 14, 260/29.6 S, 29.6 MM, 29.6 MP; 106/287 SS; 252/8.5 P

[56] References Cited
UNITED STATES PATENTS

| | | | |
|---|---|---|---|
| 2,961,799 | 11/1960 | Coe | 260/17 |
| 3,077,054 | 2/1963 | Niemeijer | 260/17.4 |
| 3,346,407 | 10/1967 | VanLeuven | 106/126 |

OTHER PUBLICATIONS

Chem. Absts. 74:23445r, "Properties–Stabilizers," Miyasawa et al.
Chem. Absts. 70:117843p, "Soil Stabilization," Borden Chem. Co.
Chem. Absts. 70:31433t, "Cement and Soil Stabiling Composition," Peeler et al.
Chem. Absts. 70:6388z, "Composition for Compacting Soil," Batistoni.
Chem. Absts. 71:53220u, "Soil Compaction Agent for Concrete Foundations," Battistoni.
Chem. Absts. 74:145918t, "Soil Stabiling Agent," Scherr et al.
Chem. Absts. 73:69512t, "Consolidation–Dispersion," Grafmueller.
Chem. Absts. 72:15542j, "Dependence–Consolidation–Waste Liquor–Roads," Choborovskaya.
Condensed Chem. Dictionary, Fifth Ed., p. 1146.

Primary Examiner—Howard E. Schain
Assistant Examiner—Edward Woodberry
Attorney, Agent, or Firm—Ralph B. Pastoriza

[57] ABSTRACT

A soil treating composition for mixing with water to form an aqueous solution for treating soil is characterized by including a synthetic latex material in a mixture including hydroxy ethyl cellulose, metal salts and powdered citric acid. For compacting earthen type soils, the mixture also includes fermented wort, nonionic surfactants and vanilla extract. For erosion control, the fermented wort, non-ionic surfactants and vanilla extract are not essential.

11 Claims, No Drawings

SOIL PENETRATING, COMPACTING AND CEMENTING COMPOSITION

This application is a continuation-in-part of my copending application, Ser. No. 170,979 filed Aug. 11, 1971, now abandoned.

This invention relates generally to compositions of matter and more particularly to soild treating compositions for mixing with water to form an aqueous solution for spraying into soil.

BACKGROUND OF THE INVENTION

Compositions of matter for facilitating the compaction of soil, sand and aggregate are well known in the art. Usually, these compositions are mixed with water and sprayed on the soil. Thereafter, a roller may be used. For certain applications such as road beds over which concrete will be applied or building foundations, the degree of compaction necessary for safety cannot always be achieved with presently known compositions. Not only is it important to eliminate voids in the soil or earth composition, but also to be assured that the soil particles are bound or cemented together.

In the case of erosion control, such compositions as have been used heretofore have not really provided effective cementation.

BRIEF DESCRIPTION OF THE PRESENT INVENTION

With the foregoing in mind, the present invention contemplates compositions of matter for penetrating, compacting and cementing soil and controlling erosion which are distinguished from all compositions heretofore known for such purposes in that they include as a major ingredient a synthetic latex material.

For compaction of earth soil, other than sand, the composition includes fermented wort along with suitable surfactants and other ingredients. The fermented wort aerates the soil by the generation of carbon dioxide so that compaction is greatly facilitated and voids are substantially eliminated. In the case of the composition for erosion control, the fermented wort and non-ionic surfactants are not essential. However, in both instances the synthetic latex material effects the cementing or binding of the soil providing a degree of cementation constituting a substantial improvement over that heretofore attainable in either compaction or erosion operations.

DETAILED DESCRIPTION OF THE INVENTION

Basically, the soil treating compositions for mixing with water to form an aqueous solution to be sprayed or otherwise applied to soil for compacting or cementing or for erosion control of the soil, both include a mixture of a synthetic latex material, selected from the group consisting of acrylic copolymer, specifically a copolymer comprised of 60–70% of a first monomer constituting ethyl or butyl acrylate and 30–40% of a second monomer constituting methyl methacrylate, or vinyl-acrylic copolymers, specifically copolymers comprised of 5–30% of a first monomer constituting butyl acrylate, isobutyl acrylate, or 2-ethyl hexyl acrylate and 70–95% of a second monomer constituting vinyl acetate.

The foregoing materials may be obtained under the trade name UCAR-360 from Union Carbide Corporation, New York, NY. UCAR is a registered trademark of Union Carbide Corporation.

Also included in the basic composition are suitable salts such as aluminum sulfate and magnesium sulfate. The aluminum sulfate enhances cementation of the soil particles; that is, it causes the soil particles to adhere together. The magnesium sulfate works with the aluminum sulfate to enhance this cementation.

A hydroxy ethyl cellulose known as Cellosize QP 100,000 obtainable from Union Carbide Corporation may be added to the basic composition. The cellulose increases the viscosity and helps maintain the homogeneity of the solution by eliminating precipitation.

The basic composition is completed by the addition of powdered citric acid.

Considering now the composition for compacting there is included in the above described basic composition a fermented wort which functions in the reduction of voids in the soil. For 55 gallons of a complete compacting composition, the fermented wort is made in accord with the following steps:

1. Start with 44 gallons of water at about 85° F.
2. Add 2 ounces of ammonium sulfate.
3. Add 2 ounces of magnesium sulfate.
4. Add 2 ounces of sodium chloride.
5. Add 1 ounce of baker's yeast.
6. Add 11 gallons of black strap molasses containing from 60–65% fermentable sugars. Cane sugar can be used in the event of fermentable sugar deficiencies.
7. Maintain the above ingredients at a temperature of from 80–85°.
8. Fermentation is to be permitted to take place for 36–72 hours.

Also included in the basic compacting composition is a first non-ionic surfactant of poly-oxy-ethylene alkyl aryl ether. This surfactant may be described as an ethylene oxide condensate with a fatty alcohol containing 10 moles of ethylene oxide. The fatty alcohol chain is composed of no more than 11 carbon atoms and not less than 8 carbon atoms. It should be noted that several other types of non-ionic surfactants could be employed in these formulations with similar results. The surfactant may be obtained under the trademark RENEX No. 690 from Atlas Chemical Company of Wilmington DE. and functions to enhance penetration of the composition into the soil.

A second non-ionic surfactant constitutes a phosphate triester surfactant completely esterfied with at least one polyethylene oxide moiety containing 2 to 100 oxide units and one or two alkyl groups containing 2 to 25 carbon atoms. This particular non-ionic surfactant is described in U.S. Pat. No. 3,449,282 and is obtainable under the trademark VICTAWET No. 12 from Stauffers Chemical Corporation, Los Angeles, Calif. This second surfactant functions as a dispersent for the latex particles.

Also included in addition to the basic composition for the compaction composition is vanilla extract. This vanilla extract may constitute, by way of example, extractable matter from 13½ ounces of dried vanilla beans that have been processed by the alcohol percolation method. The resultant product contains 35% ethyl alcohol.

An example of the method of forming that is the sequential or successive mixing steps, and the ingredients of a composition particularly useful for compacting operations in accord with the present invention is set forth as follows:

EXAMPLE 1 — COMPACTING COMPOSITION

| | INGREDIENTS | PERCENT BY WEIGHT |
|---|---|---|
| (1) | Start with fermented wort formulated in accord with steps 1 through 8 above | 32% |
| (2) | Add the non-ionic surfactant of poly-oxy-ethylene alkyl aryl ether | 01% |
| (3) | Add the non-ionic surfactant of phosphate triester | ½% |
| (4) | Add hydroxyl ethyl cellulose | ½% |
| (5) | Add aluminum sulfate | 03% |
| (6) | Add magnesium sulfate | 02% |
| (7) | Add vanilla extract as formulated above | ½% |
| (8) | Add the synthetic latex as described above | 60% |
| (9) | Add powdered citric acid | ½% |

In the case of road bed construction, from 0.1 to 2% of the foregoing compaction composition of example 1 is added to water, the water then being sprayed into the soil and compacted with a rolling or equivalent operation.

The use of the foregoing composition in the manner described insures that interstices or voids are reduced with a minimum amount of rolling thereby resulting in a substantial savings in both equipment time and labor. In fact, compaction readings of 95% Proctor or better are obtained within a few hours after application of the composition.

Considering now the composition of this invention suitable for erosion control, there follows a specific example of the sequential or successive mixing steps and ingredients involved in forming the composition:

EXAMPLE 2 — EROSION COMPOSITION

| | INGREDIENTS | PERCENT BY WEIGHT |
|---|---|---|
| (1) | Start with water | 14½% |
| (2) | Add hydroxy-ethyl cellulose | ¼% |
| (3) | Add aluminum sulfate | 03% |
| (4) | Add magnesium sulfate | 02% |
| (5) | Add the synthetic latex as described above | 80% |
| (6) | Add powdered citric acid | ¼% |

If desired, a powdered green dye (less than 0.1%) may be added for esthetic purposes.

After thorough mixing of the above ingredients, they may be added in a proportion of from 3 to 20% to water to form the desired aqueous solution. This solution is then sprayed on the soil or sand to provide the desired erosion control. From 1 to 3 days are sufficient to assure proper bonding and cementation.

Variations in the amounts of the essential ingredients in both of the examples 1 and 2 can be tolerated for certain soil conditions. These variations are as follows:

| ESSENTIAL INGREDIENTS | PERCENTAGE VARIATION BY WEIGHT |
|---|---|
| Water (where fermented wort is not used) | 10% to 30% |
| Synthetic latex | 50% to 90% |
| Hydroxy-ethyl cellulose | ¼ to 1% |
| Aluminum sulfate | 01 to 05% |
| Magnesium sulfate | 01 to 04% |
| Powdered citric acid | ¼ to 1% |

With respect to the non-essential ingredients, the following variations may be tolerated for certain soil conditions:

| NON-ESSENTIAL INGREDIENTS | PERCENTAGE VARIATION BY WEIGHT |
|---|---|
| Fermented wort | 20 to 50% |
| Non-ionic surfactant of poly-oxy-ethylene alkyl aryl ether | ½ to 2½% |
| Non-ionic surfactant phosphate triester | ¼ to 01% |
| Vanilla extract | ¼ to 1½% |

The variation in the percent of the composition for compaction to be mixed with water such as set forth in example 1 preparatory to the final spraying may be from 0.1 to 2%.

The variation in the percent mixture of the composition for erosion control made in accord with example 2 with water preparatory to the final spraying may be from 3 to 25%.

Both of the initial compositions for compaction or erosion should have a pH of from 2.5 to 3.4.

EFFECT OF VARIOUS INGREDIENTS

In the case of the compaction composition, the fermented wort formed from black strap molasses contains many materials beneficial to reducing voids; for example, carbon dioxide, potassium chloride, and calcium chloride. These compounds also help to maintain the moisture balance in the soil during the construction of highways, earthen filled dams, back fills and so forth. There thus results a substantial savings on watering costs as well as in the length of time for equipment rolling operations as mentioned heretofore.

In one sense, the fermented wort is a type of polyhydric alcohol and acts as a protective colloid for the latex system employed in the compaction composition of this invention.

As mentioned, the synthetic latex at concentrations of from 50 to 90% assures cementation to an extent that excellent compaction is realizable when added to the fermented wort. Latex coated soil particles resist weathering and moisture by forming insoluble water complexes in the soil thereby rendering excellent heave-thaw stability.

The same foregoing characteristics are present in the erosion control composition rendering this particular composition not only useful for conventional erosion control but also for lining river banks and river bottoms.

The use of the aluminum sulfate and magnesium sulfate in both compositions and as mentioned heretofore enhances cementation of the soil particles. Certain construction soils are not readily compacted if they are lacking in these salts and proper erosion control of certain soils similarly requires the salts.

In the case of the compaction composition, the non-ionic surfactants aid penetration and permeation of the composition into the soil.

From the foregoing, it will thus be evident that the present invention has provided vastly improved compositions for soil compaction and erosion control.

What is claimed is:

1. A soil treating composition for mixing with water to form an aqueous solution for penetrating, compacting and cementing soil, including a mixture, by weight of:
a. 10 to 30% water;
b. 50 to 90% of a synthetic latex material selected from the group consisting of acrylic copolymer specifically a copolymer comprised of 60–70% of a first monomer constituting ethyl or butyl acrylate and 30–40% of a second monomer constituting methyl methacrylate or vinyl-acrylic copolymers, specifically copolymers comprised of 5–30% of a first monomer constituting butyl acrylate isobutyl acrylate, or 2-ethyl hexyl acrylate and 70–95% of a second monomer constituting vinyl acetate;
c. ¼ to 01% hydroxy ethyl cellulose;
d. 01 to 05% aluminum sulfate;
e. 01 to 04% magnesium sulfate; and,
f. ¼ to 01% powdered citric acid.

2. A composition of claim 1, in which from 3 to 20% of the same is added to water to form a desired aqueous solution for spraying into soil or sand to penetrate the same and provide a desired erosion control.

3. A composition according to claim 2, in which the percent by weight of water is 14½%, the percent weight of synthetic latex is 80%, the percent weight of hydroxy ethyl cellulose is ¼%, the percent weight of aluminum sulfate is 3%, the percent weight of magnesium sulfate is 2%, and the percent weight of powdered citric acid is ¼%.

4. A composition according to claim 2 in which less than 01% by weight of a powdered green dye is added to the composition.

5. A soil treating composition for mixing with water to form an aqueous solution for compacting and cementing soil, including a mixture by weight of:
a. 20 to 50% fermented wort formulated, for 55 gallons of a complete composition, by adding to 44 gallons of water at about 85° F, 2 ounces of ammonium sulfate, 2 ounces of magnesium sulfate, 2 ounces of sodium chloride, 1 ounce of baker's yeast, and 11 gallons of black strap molasses containing from 60–65% fermentable sugars, the foregoing ingredients being maintained at a temperature of from 80° to 85° for a period of from 36 to 72 hours;
b. ½ to 2½% of non-ionic surfactant of poly-oxy-ethylene-alkyl aryl ether;
c. ¼ to 01% of a non-ionic surfactant phosphate triester;
d. ¼ to 01% hydroxy ethyl cellulose;
e. 01 to 05% aluminum sulfate;
f. 01 to 04% magnesium sulfate;
g. ¼ to 1½% vanilla extract; and
h. 50 to 90% synthetic latex selected from the group consisting of acrylic copolymer, specifically a copolymer comprised of 60–70% of a first monomer constituting ethyl or butyl acrylate and 30–40% of a second monomer constituting methyl methacrylate or vinyl-acrylic copolymers specifically copolymers comprised of 5–30% of a first monomer constituting butyl acrylate isobutyl acrylate, or 2-ethyl hexyl acrylate and 70–95% of a second monomer constituting vinyl acetate; and ¼ to 01% powdered citric acid.

6. The composition of claim 5 in which from 0.1 to 2% is added to water to form an aqueous solution for spraying into the soil preparatory to being compacted with a rolling or equivalent operation.

7. A composition according to claim 6 in which the non-ionic surfactant of poly-oxy-ethylene alkyl aryl ether comprises an ethylene oxide condensate with a fatty alcohol containing 10 moles of ethylene oxide, the fatty alcohol chain being composed of no more than 11 carbon atoms and not less than 8 carbon atoms; and in which the non-ionic surfactant of phosphate triester constitutes a phosphate triester completely esterified with at least one polyethylene oxide moiety containing 2 to 100 oxide units and 1 or 2 alkyl groups containing 2 to 25 carbon atoms.

8. A composition according to claim 6, in which the vanilla extract constitutes extractable matter from dried vanilla beans that have been processed by the alcohol percolation method, the resultant product containing about 35% ethyl alcohol.

9. A composition according to claim 6 in which there is provided 32% fermented wort, 01% non-ionic surfactant of poly-oxy-ethylene alkyl aryl ether, ½% of non-ionic surfactant of phosphate triester, ½% of hydroxy ethyl cellulose, 3% of aluminum sulfate, 2% of magnesium sulfate ½% of vanilla extract, 60% of said synthetic latex, and ½% of powdered citric acid.

10. A method of forming the composition of claim 3 for erosion control comprising the steps of successively mixing together the ingredients in the amounts set forth in claim 3 in the following order: water, hydroxy-ethyl cellulose, aluminum sulfate, magnesium sulfate, synthetic latex, and powdered citric acid.

11. The method of forming the composition of claim 9 for compacting and cementing soil comprising the steps of successively mixing the ingredients in the order given and in the amounts set forth in claim 9.

* * * * *